US011998413B1

(12) United States Patent
Li

(10) Patent No.: US 11,998,413 B1
(45) Date of Patent: Jun. 4, 2024

(54) ELECTRIC TOOTHBRUSH REPLACEMENT HEAD DEVICE

(71) Applicant: Mingfeng Li, Gaozhou (CN)

(72) Inventor: Mingfeng Li, Gaozhou (CN)

( * ) Notice: Subject to any disclaimer, the term of this patent is extended or adjusted under 35 U.S.C. 154(b) by 0 days.

(21) Appl. No.: 18/513,694

(22) Filed: Nov. 20, 2023

(51) Int. Cl.
  *A61C 17/22* (2006.01)
  *A46B 5/00* (2006.01)
  *A46B 9/04* (2006.01)
  *A46B 13/02* (2006.01)

(52) U.S. Cl.
  CPC .......... *A61C 17/222* (2013.01); *A46B 5/0095* (2013.01); *A46B 9/04* (2013.01); *A61C 17/225* (2013.01); *A46B 13/023* (2013.01)

(58) Field of Classification Search
  CPC ... A61C 17/222; A61C 17/225; A46B 5/0095; A46B 9/04
  See application file for complete search history.

(56) References Cited

U.S. PATENT DOCUMENTS

| | | | |
|---|---|---|---|
| 11,071,613 B1* | 7/2021 | Zhou | A46B 9/04 |
| 2021/0137259 A1* | 5/2021 | Varch | A46D 3/005 |
| 2022/0175126 A1* | 6/2022 | Ramirez | A46B 9/04 |
| 2023/0140465 A1* | 5/2023 | Johnson | A61C 17/222 |
| | | | 15/22.2 |

FOREIGN PATENT DOCUMENTS

| DE | 202021103701 U1 * | 7/2021 | A46B 7/06 |
|---|---|---|---|
| EP | 4094623 A1 * | 11/2022 | A61C 17/222 |

* cited by examiner

*Primary Examiner* — Laura C Guidotti
(74) *Attorney, Agent, or Firm* — WPAT, P.C

(57) ABSTRACT

An electric toothbrush replacement head device is provided, and the device includes a toothbrush replacement head body, the toothbrush replacement head body includes a toothbrush handle and a toothbrush head, the toothbrush head includes a brush assembly, the brush assembly is provided with bristles thereon, a bottom of the toothbrush handle is provided with a tail plug, the tail plug includes a tail plug seat, a lug boss, a tail plug column and an elastic sheet, the lug boss is disposed on the tail plug seat, the tail plug column is disposed on the lug boss, and the elastic sheet is disposed on an upper and middle part of the tail plug column; and the toothbrush handle is made of a bamboo material. The replacement head device with simple structure is provided to make installation and disassembly more flexible, usage more convenient, cleaning effect for teeth better, thus reducing costs.

17 Claims, 8 Drawing Sheets

ELECTRIC TOOTHBRUSH REPLACEMENT HEAD DEVICE

TECHNICAL FIELD

The disclosure relates to the field of electric toothbrush technologies, and more particularly to an electric toothbrush replacement head device having toothbrush handle made of bamboo material.

BACKGROUND

Electric toothbrushes usually have removable and replaceable attached brushes, which are also known as "replacement heads", thus a common handle can be used by multiple family members, and each family member has an independent personal replacement head. Furthermore, it is only necessary to replace the replacement head rather than an entire electric toothbrush including the handle when a brush head needs to be replaced, such as the brush head is worn.

In the process of brushing teeth, various forces must be transmitted through a connection between the replacement head and the handle during a brushing operation. These forces specifically include a cleaning force, a driving force, an axis force and a radial force acting on the replacement head and/or the handle. The connection between the replacement head and the handle is usually achieved in such a way that the radial force is absorbed or dissipated in the handle and the axis force is absorbed or dissipated in a driving shaft. To this end, a tubular connector of the replacement head is usually pushed onto a connecting rod or a neck of the toothbrush, and a driving shaft disposed in a brush tube of the replacement head is connected to a driving shaft protruding from an end of the connecting rod of the handle.

The electric toothbrushes have been widely used due to their high efficiency, portability, and excellent cleaning effect, existing electric toothbrushes mostly use a rapid rotation of a motor to drive the toothbrush head to vibrate, thus ensuring a good cleaning effect. Internal structures of the existing electric toothbrushes are complex, and excessive assembly parts bring corresponding costs to a production and processing process of the existing electric toothbrush, and a damage rate of the entire toothbrush is high; in addition, a high-speed rotation of the motor drives the toothbrush head to vibrate through transmission components, and an instability of the internal structure can easily cause structural damage, thereby affecting a normal use of the electric toothbrushes and causing poor teeth cleaning effect.

At present, the toothbrush handles of the electric toothbrushes on the market are mostly made of plastic, which affects environmental protection and is structurally unreasonable, resulting in inconvenient disassembly and poor cleaning effect for teeth. Therefore, consumers hope for an electric toothbrush that is more convenient to use, lighter to use, and has better teeth cleaning effects.

SUMMARY

A main purpose of the disclosure is to provide an electric toothbrush replacement head device having toothbrush handle made of bamboo material with a simple structure, more flexible installation and detachment, more convenient use, better teeth cleaning effect, which can reduce costs.

In order to achieve the above purpose, the disclosure provides an electric toothbrush replacement head device, and the device includes a toothbrush replacement head body, the toothbrush replacement head body includes a toothbrush handle and a toothbrush head, the toothbrush head includes a brush assembly, the brush assembly is provided with bristles thereon, a bottom of the toothbrush handle is provided with a tail plug, the tail plug includes a tail plug seat, a lug boss, a tail plug column and an elastic sheet, the lug boss is disposed on the tail plug seat, the tail plug column is disposed on the lug boss, and the elastic sheet is disposed on an upper and middle part of the tail plug column; and the toothbrush handle is made of a bamboo material.

In an embodiment, the brush assembly defines implantation holes, and the toothbrush head includes fused adhesive columns.

In an embodiment, the toothbrush head defines a brush installation groove, a size and a shape of the brush installation groove correspond to that of the brush assembly, and the brush assembly is disposed in the brush installation groove.

In an embodiment, a back of the elastic sheet is provided with an elastic sheet protrusion.

In an embodiment, two sides of the elastic sheet are respectively provided with films attached on the tail plug column.

In an embodiment, the tail plug seat defines a first glue overflow groove, and the lug boss defines a second glue overflow groove.

In an embodiment, a bottom of the tail plug defines a tail plug hole, an inside of the tail plug is in a hollow state, and the tail plug defines an axis installing hole therein for installing an axis of a main engine.

Beneficial effects of the disclosure are as follows.

(1) The toothbrush handle of the disclosure is made of the bamboo material, which greatly reduces costs, the toothbrush handle is lighter to use, is beneficial to environmental protection, and is safer and more reliable to use.

(2) A copper-free bristle implantation technology is used in the disclosure to reduce pollution caused by rusting of copper sheets with a copper bristle implantation technology, and the copper-free bristle implantation technology is more beneficial for human health.

(3) The tail plug of the disclosure uses a closed structure integrated by the films and the elastic sheet to make two sides of the elastic sheet have no openings, which can effectively prevent glue from entering the tail plug therein during installation to affect the use of the toothbrush head.

(4) In the disclosure, the main engine is vibrated to transfer the vibration to the toothbrush handle through the tail plug, to thereby make the bristles vibrate, so as to achieve a cleaning effect for teeth, the toothbrush replacement head of the disclosure has a simple structure, a strong cleaning power, and a better cleaning effect.

BRIEF DESCRIPTION OF DRAWINGS

In order to provide a clearer explanation of technical solutions in embodiments of the disclosure or related art, drawings required in the embodiments or the related art descriptions will be simply introduced below. Apparently, the drawings described below are merely some of the embodiments of the disclosure, for those skilled in the art, other drawings can be obtained without creative work according to structures shown in the drawings.

LIST OF REFERENCE NUMBERS

Figure 1:
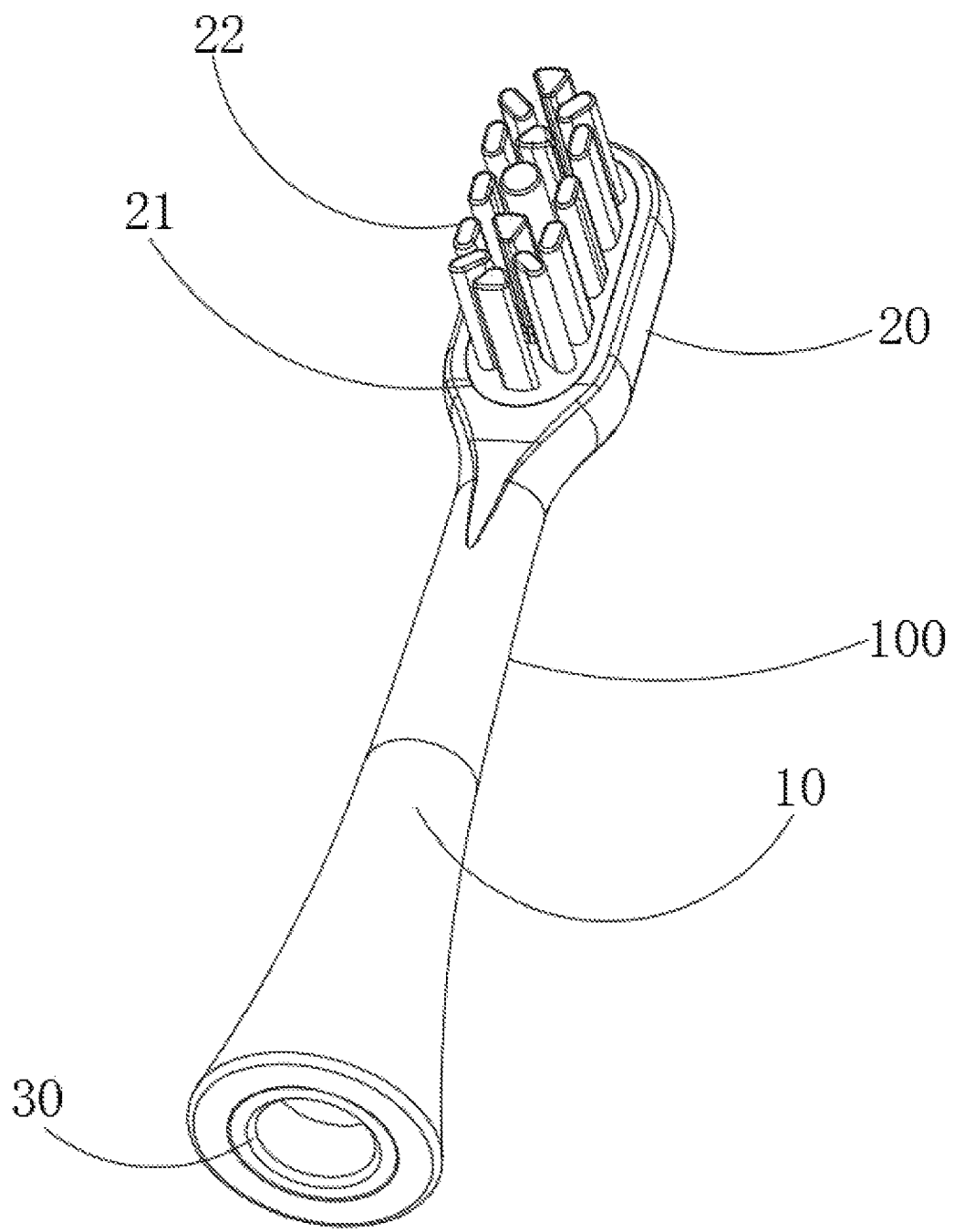
FIG. 1 illustrates a schematic structural diagram of an electric toothbrush replacement head device according to an embodiment of the disclosure.

100-toothbrush replacement head body; 10-toothbrush handle; 11-bottom hole of toothbrush handle; 20-toothbrush head; 21-brush assembly; 201-brush installation grove; 211-fused adhesive column; 212-implantation hole; 22-bristles; 30-tail plug; 31-tail plug seat; 311-first glue overflow groove; 32-lug boss; 321-second glue overflow groove; 33-tail plug column; 331-elastic sheet; 3311-elastic sheet protrusion; 332-first film; 333-second film; 34-axis installing hole; 35-tail plug hole; 40-main engine; 41-axis.

Implementations of purposes, function features and advantages of the disclosure are further described with reference to the drawings.

DETAILED DESCRIPTION OF EMBODIMENTS

Technical solutions in embodiments of the disclosure will be clearly and completely described in conjunction with drawings in the embodiments of the disclosure below, apparently, the described embodiments are merely some of the embodiments of the disclosure, not all of them. Based on the embodiments in the disclosure, all other embodiments obtained by those skilled in the art without creative work fall within a scope of protection of the disclosure.

It should be noted that in the embodiments of the disclosure, all directional indications (such as up, down, left, right, front and rear . . . ) are merely used to describe a relative positional relationship and a motion situation between components under a specific posture (as shown in drawings), the directional indication changes accordingly when the specific posture changes.

In the disclosure, unless otherwise specified and limited, "connect", "fix" and other terms should be understood in a broad sense. For example, the term "connect" can be a fixed connection, a detachable connection, or an integrally formed; it can be a mechanical connection, an electrical connection, or in communication with each other; It can be a direct connection or an indirect connection through an intermediate medium, which can be an internal communication between two components or an interaction relationship between two components, unless otherwise specified. For those skilled in the art, the specific meanings of the above terms in the disclosure can be understood based on specific circumstances.

Moreover, when there are descriptions of "first", "second" and the like in the embodiments of the disclosure, terms "first", and "second" are merely used to describe purposes, and cannot be understood to indicate or imply relative importance or implicitly indicate the number of indicated technical features. Thus, features defined with "first" and "second" can explicitly or implicitly include one or more of the features. Furthermore, a meaning of "and/or" appearing in the entire text includes three parallel solutions, and taking "A and/or B" as an example, it includes A solution, or B solution, or a solution that meets both A and B simultaneously. In addition, the technical solutions between various embodiments can be combined with each other, but must be based on what those skilled in the art can achieve, it should be considered that a combination of the technical solutions does not exist and is not within the scope of protection required by the disclosure when the combination of the technical solutions conflicts or cannot be achieved.

The disclosure provides an electric toothbrush replacement head device.

As shown in FIGS. 1-5 and 8, in an embodiment of the disclosure, the electric toothbrush replacement head device includes a toothbrush replacement head body 100, the toothbrush replacement head body 100 includes a toothbrush handle 10 and a toothbrush head 20, the toothbrush head 20 includes a brush assembly 21, the brush assembly 21 is provided with bristles 22 thereon, a bottom of the toothbrush handle 10 is provided with a tail plug 30, the tail plug 30 includes a tail plug seat 31, a lug boss 32, a tail plug column 33 and an elastic sheet 331, the lug boss 32 is disposed on the tail plug seat 31, the tail plug column 33 is disposed on the lug boss 32, and the elastic sheet 331 is disposed on the tail plug column 33; and the toothbrush handle 10 is made of a bamboo material.

In the embodiment, the bottom of the toothbrush handle 10 defines a bottom hole 11 of toothbrush handle, and the tail plug 30 is disposed in the toothbrush handle 10 through the bottom hole 11 of toothbrush handle.

In the embodiment, the toothbrush replacement head body 100 includes the brush assembly 21, the toothbrush handle 10 and the tail plug 30.

As shown in FIG. 2, FIG. 5, FIG. 6 and FIG. 8, in the embodiment, a bottom of the tail plug 30 defines a tail plug hole 35, an inside of the tail plug 30 is in a hollow state, and the tail plug 30 defines an axis installing hole 34 therein for installing an axis 41 of a main engine 40.

During use of the disclosure, the toothbrush replacement head body 100 is installed on the main engine 40, the axis 41 of the main engine 40 is inserted into the axis installation hole 34 of the tail plug 30 through the tail plug hole 35, and the axis installation hole 34 is in close-fitting installation with the axis 41. When the main engine 40 is started, power is output from the axis 40 and transferred to the tail plug 30 through a connection surface between the axis installation hole 34 and the axis 41, and the power is transferred from the tail plug 30 to the toothbrush handle 10 to drive the bristles 22 on the brush assembly 21 to swing, so as to achieve a purpose of cleaning teeth.

As shown in FIGS. 1-4, in the embodiment, the brush assembly 21 defines implantation holes 212, and the brush assembly 21 includes fused adhesive columns 211.

Figure 3:
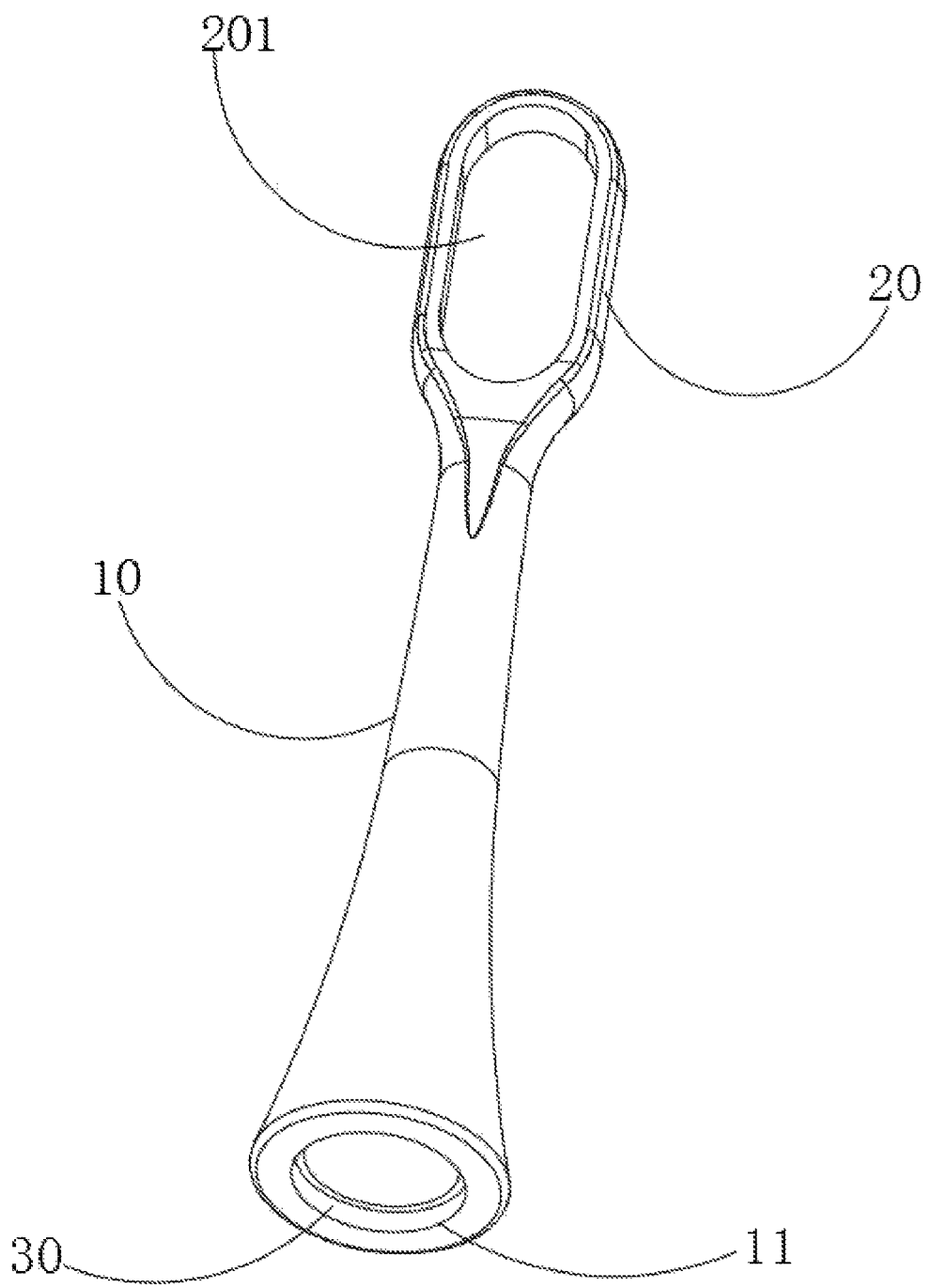
FIG. 3 illustrates still another schematic structural diagram of the electric toothbrush replacement head device according to an embodiment of the disclosure.
Figure 4:
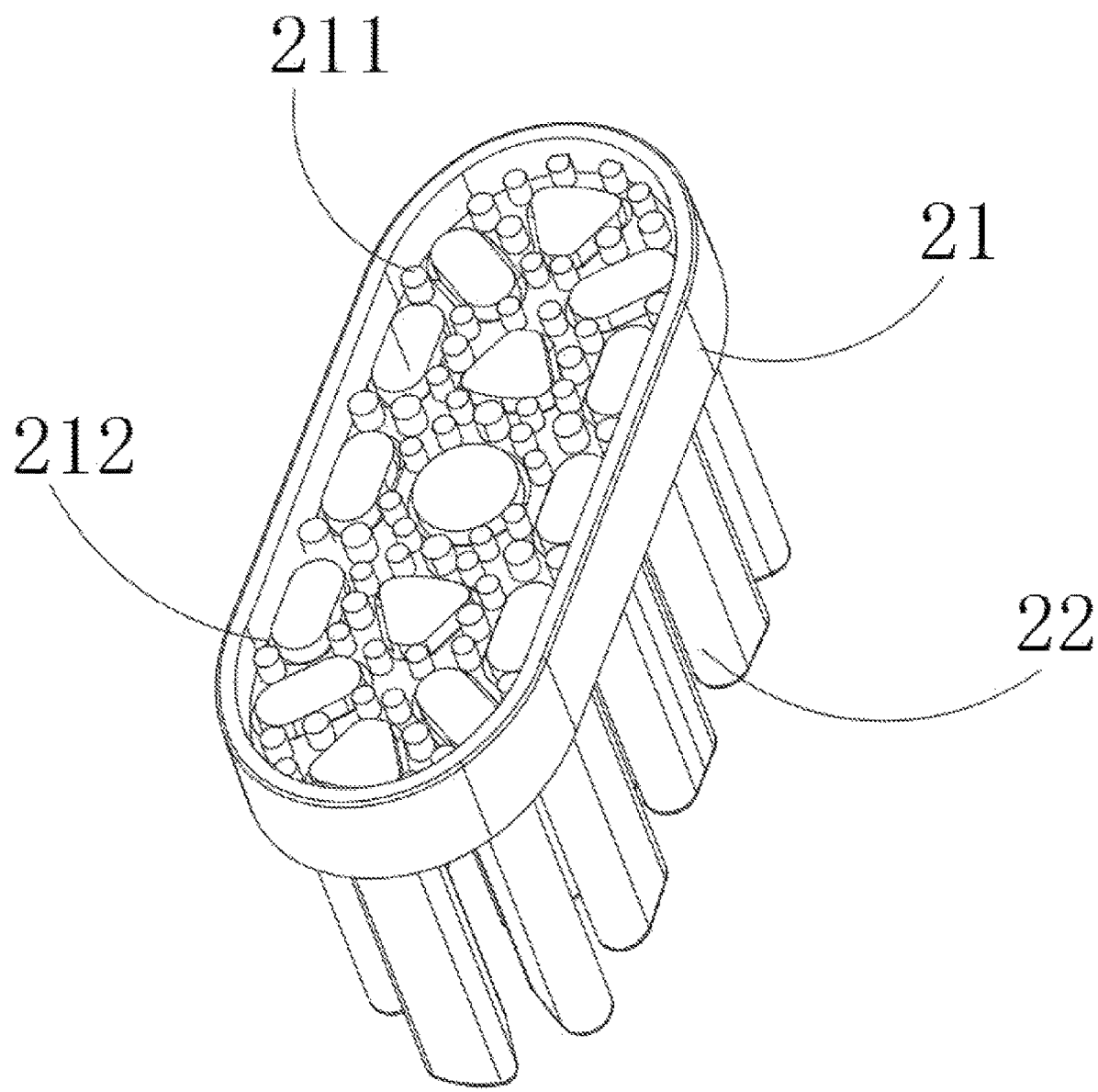
FIG. 4 illustrates a schematic structural diagram of a brush assembly of the electric toothbrush replacement head device according to an embodiment of the disclosure.
Figure 5:
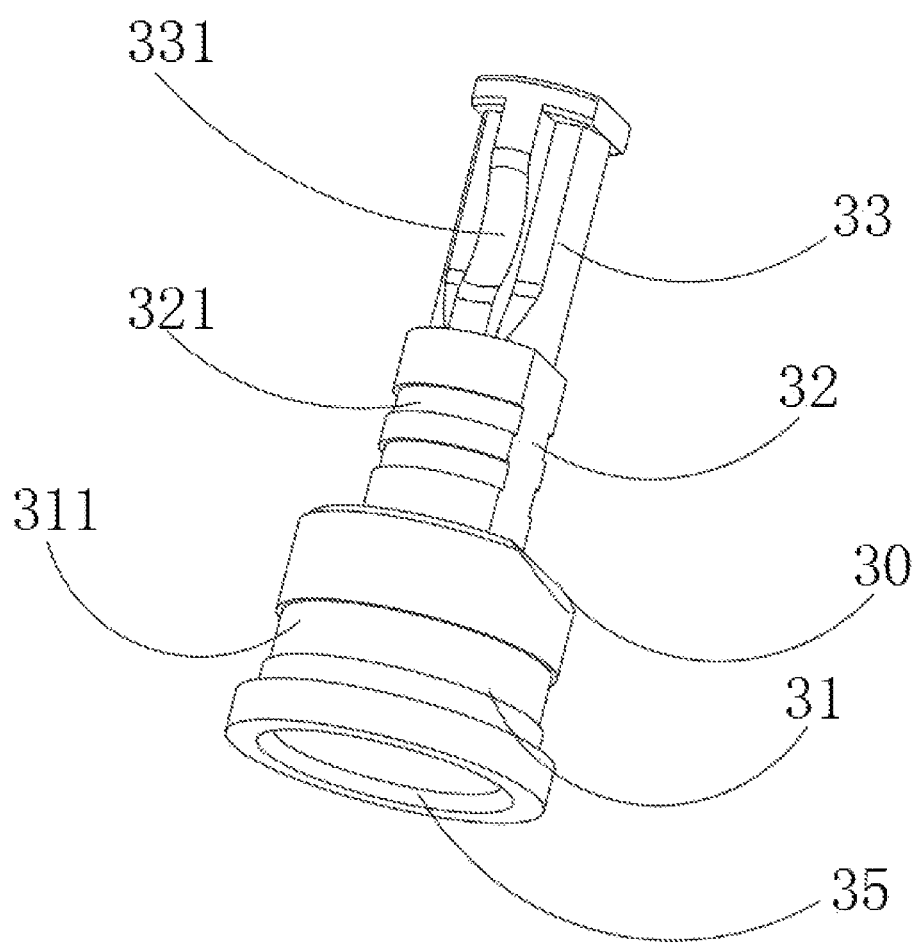
FIG. 5 illustrates a schematic structural diagram of a tail plug of a toothbrush head of the electric toothbrush replacement head device according to an embodiment of the disclosure.
Figure 6:
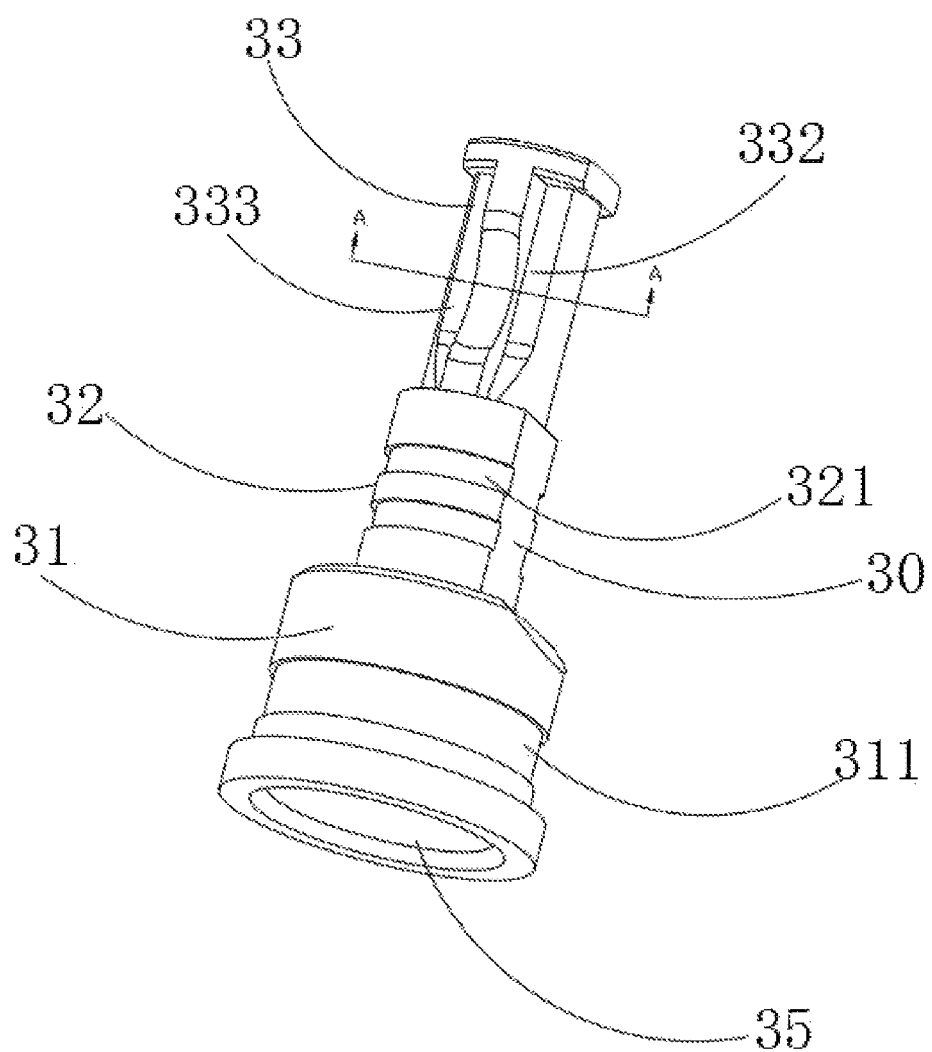
FIG. 6 illustrates another schematic structural diagram of the tail plug of the toothbrush head of the electric toothbrush replacement head device according to an embodiment of the disclosure.
Figure 7:
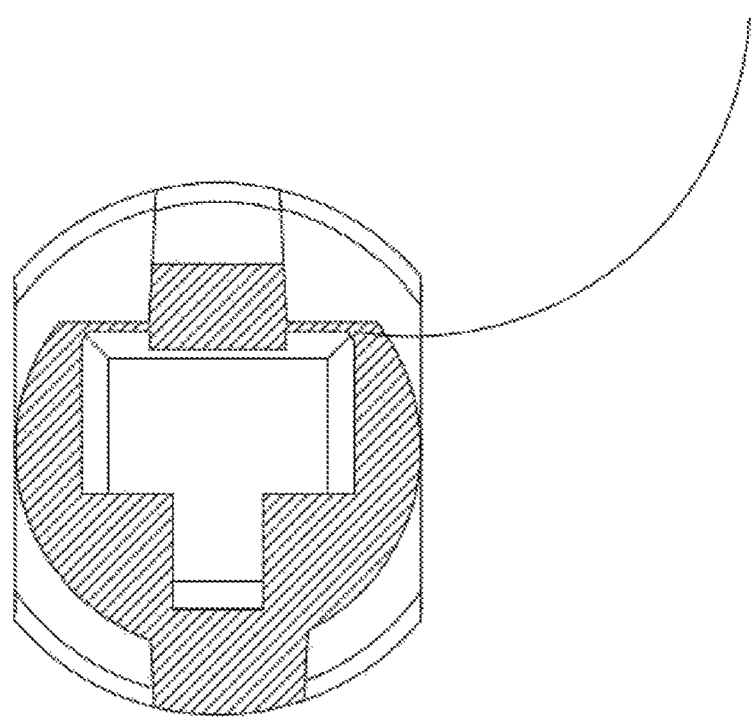
FIG. 7 illustrates an enlarged schematic structural diagram of a film of the tail plug of the electric toothbrush replacement head device according to an embodiment of the disclosure.
Figure 8:
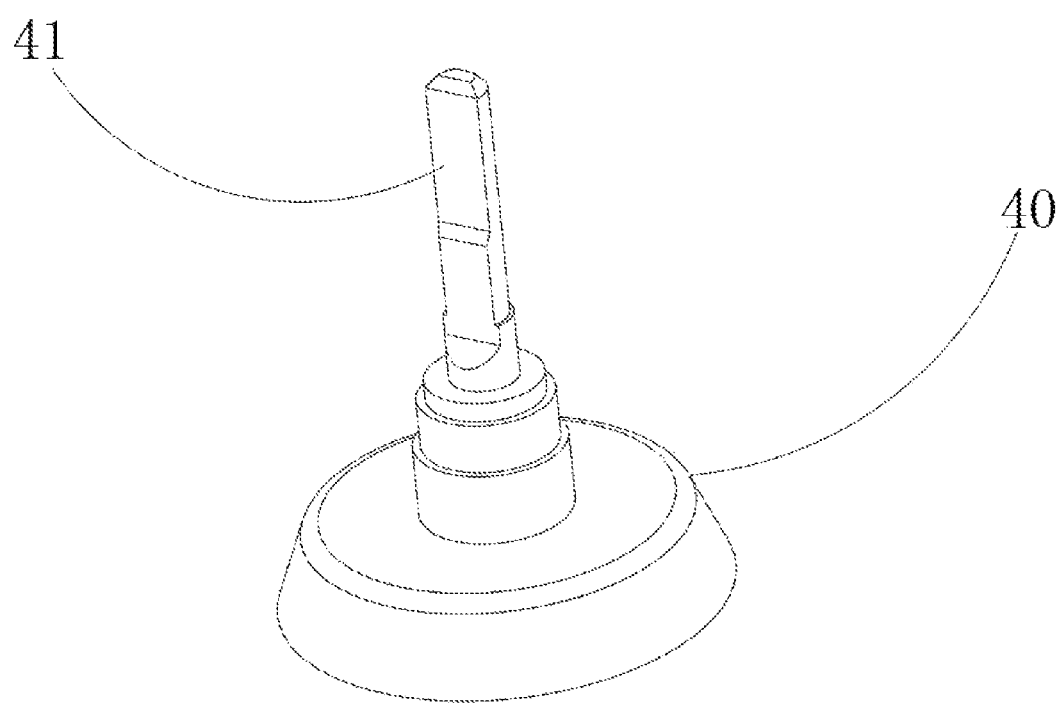
FIG. 8 illustrates a schematic structural diagram of a main engine of the electric toothbrush replacement head device according to an embodiment of the disclosure.

As shown in FIG. 3, in the embodiment, the toothbrush head 20 defines a brush installation groove 201, a size and a shape of the brush installation groove 201 correspond to that of the brush assembly 21, and the brush assembly 21 is disposed in the brush installation groove 201. In an embodiment, the brush assembly 21 is fixed on the toothbrush handle 10 through a glue fixation method.

In the embodiment, the brush assembly 21 defines the implantation holes 212, the implantation holes 212 are made into different shapes according to actual needs, the implantation holes 212 are used to install the bristles 22, tops of the bristles 22 are made into a shape fitting the teeth, so as to improve goodness of fit and improve the cleaning effect, the fused adhesive columns 211 are disposed adjacent to the implantation holes 212, and the bristles 22 in the implantation holes 212 are fused with the fused adhesive columns 211 to form the brush assembly 21 through a hot-pressing welding method.

It is different from a current process of installing the bristles through copper sheets on the market, the brush assembly 21 uses a copper-free bristle implantation technology, which can avoid pollution caused by rusting of copper sheets, reduce bacterial growth, and ensure safety and hygiene.

In the embodiment, a material of the toothbrush handle 10 is bamboo, that is, natural bamboo is mechanically processed to form an appearance of the toothbrush handle 10. The toothbrush handle 10 made by the bamboo is not only lighter to use, but also greatly reduces the cost and is suitable for general promotion. The bamboo material may be *Dendrocalamopsis beecheyana* (Munro)Keng f.

As shown in FIG. 1, FIG. 2, FIG. 4, FIG. 5 and FIG. 8, in the embodiment, the bottom of the toothbrush handle 10 defines the bottom hole 11 of the toothbrush handle, and the bottom hole 11 of the toothbrush handle is used to install and fix the tail plug 30.

The tail plug 30 is a circular structure, and is fixed in the bottom hole 11 of the toothbrush handle by using glue, the tail plug 30 includes the tail plug seat 31, the lug boss 32, the tail plug column 33 and the elastic sheet 331, the lug boss 32 is disposed on the tail plug seat 31, the tail plug column 33 is disposed on the lug boss 32, and the elastic sheet 331 is disposed on an upper and middle part of the tail plug column 33.

In the embodiment, the tail plug seat 31 defines a first glue overflow groove 311 thereon, and the lug boss 32 defines a second glue overflow groove 321 thereon, and the first glue overflow groove 311 and the second glue overflow groove 321 can be defined as multiple according to the actual needs.

The first glue overflow groove 311 and the second glue overflow groove 321 are used to accommodate excess glue during installation; and the elastic sheet 331 is used to compact the axis 41 of the main engine 40, so as to transfer the power from the axis 41.

Figure 2:
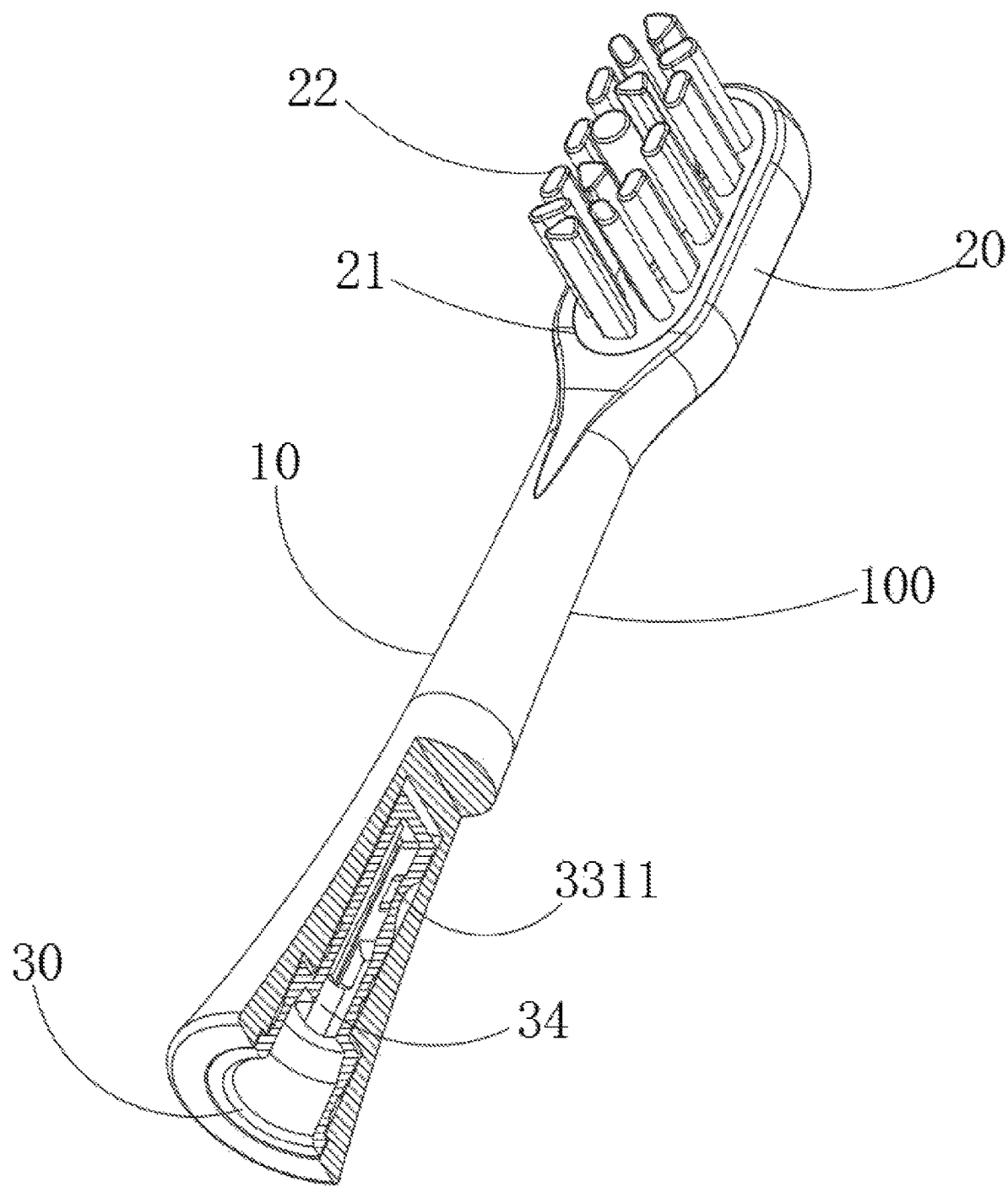
FIG. 2 illustrates another schematic structural diagram of the electric toothbrush replacement head device according to an embodiment of the disclosure.

As shown in FIG. 2, in the embodiment, a back of the elastic sheet 331 is provided with an elastic sheet protrusion 3311.

The axis 41 of the main engine 40 defines a groove thereon (not shown in the drawings), a frictional force is generated by the elastic sheet protrusion 3311 on the elastic sheet 331 and the groove on the axis 41 of the main engine 40, thus preventing the toothbrush replacement head body 100 from pulling out of the axis 41 during vibration.

As shown in FIGS. 5-8, in the embodiment, two sides of the elastic sheet 331 are respectively provided with a first film 332 and a second film 333 attached on the tail plug column 33.

The two sides of the elastic sheet 331 are respectively attached with the first film 332 and the second film 333, and the first film 332 and the second film 333 can make the elastic sheet 331 to remain elastic, and make two sides of the elastic sheet 331 have no openings (i.e., the opening of the tail plug column 33 is closed by the elastic sheet 331, the first film 332 and the second film 333). A structure of the elastic sheet 331 in the embodiment is different from that of most of existing elastic sheets with openings, when using the glue to install the tail plug 30, the sheet structure without openings on two sides can effectively prevent the glue entering the inside of the tail plug 30 during the installation to affect the use of the toothbrush head.

A hollow position inside the tail plug 30 is the axis installing hole 34, and the axis installing hole 34 is used to install the axis 41 of the main engine 40, which makes the toothbrush head 20 be installed on the main engine 40, and tightly connected with the main engine 40.

The electric toothbrush replacement head device of the disclosure optimizes original design, which makes the structure simpler, the use more lightweight, and the cleaning effect better, so as to greatly reduce costs, The above are merely optional embodiments of the disclosure and do not limit a patent protection scope of the disclosure, any equivalent structural changes made using the specification and the drawings of the disclosure, or direct/indirect applications in other related technical fields, are included in the patent protection scope of the disclosure.

What is claimed is:

1. An electric toothbrush replacement head device, comprising: a toothbrush replacement head body, wherein the toothbrush replacement head body comprises a toothbrush handle and a toothbrush head, and the toothbrush head comprises a brush assembly, the brush assembly is provided with bristles thereon, a bottom of the toothbrush handle is provided with a tail plug, the tail plug comprises a tail plug seat, a lug boss, a tail plug column, and an elastic sheet, the lug boss is disposed on the tail plug seat, the tail plug column is disposed on the lug boss, and the elastic sheet is disposed on an upper and middle part of the tail plug column; and the toothbrush handle is made of a bamboo material; and wherein the tail plug seat defines a first glue overflow groove, and the lug boss defines a second glue overflow groove.

2. The electric toothbrush replacement head device as claimed in claim 1, wherein the bottom of the toothbrush handle defines a bottom hole of toothbrush handle, and the tail plug is disposed in the toothbrush handle through the bottom hole of toothbrush handle.

3. The electric toothbrush replacement head device as claimed in claim 1, wherein the brush assembly defines implantation holes, and the brush assembly comprises fused adhesive columns.

4. The electric toothbrush replacement head device as claimed in claim 3, wherein the toothbrush head defines a brush installation groove, a size and a shape of the brush installation groove correspond to that of the brush assembly, and the brush assembly is disposed in the brush installation groove.

5. The electric toothbrush replacement head device as claimed in claim 1, wherein a back of the elastic sheet is provided with an elastic sheet protrusion.

6. The electric toothbrush replacement head device as claimed in claim 5, wherein two sides of the elastic sheet are respectively provided with films attached on the tail plug column.

7. The electric toothbrush replacement head device as claimed in claim 6, wherein the films comprise a first film and a second film, and the first film and the second film are configured to close the two sides of the elastic sheet.

8. The electric toothbrush replacement head device as claimed in claim 1, wherein a bottom of the tail plug defines a tail plug hole, an inside of the tail plug is in a hollow state, and the tail plug defines an axis installing hole therein for installing an axis of a main engine.

9. An electric toothbrush replacement head device, comprising:
- a toothbrush handle;
- a tail plug, disposed in the toothbrush handle;
- a toothbrush head, disposed on an end of the toothbrush handle facing away from the tail plug, wherein the toothbrush head comprises: a brush assembly, and the brush assembly is provided with bristles thereon;
- wherein the tail plug comprises:
  - a tail plug seat;
  - a lug boss, disposed on the tail plug seat;
  - a tail plug column, disposed on the lug boss; wherein a side surface of the tail plug column defines an opening; and
  - an elastic sheet, disposed in the opening of the tail plug column; and
  - films, disposed in the opening of the tail plug column and located at two sides of the elastic sheet; wherein the films and the elastic sheet are connected to close the opening;
- wherein the tail plug seat defines at least one first glue overflow groove, and the lug boss defines at least one second glue overflow groove.

10. The electric toothbrush replacement head device as claimed in claim 9, wherein maximum outer diameters of the tail plug seat, the lug boss and the tail plug column are sequentially decreased in that order.

11. The electric toothbrush replacement head device as claimed in claim 9, wherein the elastic sheet protrudes outwards relative to the films.

12. The electric toothbrush replacement head device as claimed in claim 9, wherein the brush assembly defines implantation holes, the bristles are respectively disposed in the implantation holes, and the brush assembly comprises fused adhesive columns.

13. The electric toothbrush replacement head device as claimed in claim 9, wherein the toothbrush head defines a brush installation groove, a size and a shape of the brush installation groove correspond to that of the brush assembly, and the brush assembly is disposed in the brush installation groove.

14. The electric toothbrush replacement head device as claimed in claim 9, wherein a bottom of the tail plug defines a tail plug hole, an inside of the tail plug is in a hollow state, and the tail plug defines an axis installing hole therein for installing an axis of a main engine.

15. The electric toothbrush replacement head device as claimed in claim 14, wherein a back of the elastic sheet is provided with an elastic sheet protrusion, and the elastic sheet protrusion is configured to compact the axis of the main engine.

16. The electric toothbrush replacement head device as claimed in claim 9, wherein the toothbrush handle is made of a bamboo material.

17. An electric toothbrush replacement head device, comprising:
- a toothbrush handle; wherein the toothbrush handle is made of a bamboo material;
- a tail plug, disposed in a bottom of the toothbrush handle;
- a toothbrush head, disposed on an end of the toothbrush handle facing away from the tail plug, wherein the toothbrush head comprises: a brush assembly, and the brush assembly is provided with bristles thereon;
- wherein the tail plug comprises:
  - a tail plug seat;
  - a lug boss, disposed on the tail plug seat;
  - a tail plug column, disposed on the lug boss; and
  - an elastic sheet, disposed on an upper and middle part of the tail plug column; and
- wherein a back of the elastic sheet is provided with an elastic sheet protrusion, two sides of the elastic sheet are respectively provided with films attached on the tail plug column, and the films comprise a first film and a second film, and the first film and the second film are configured to close the two sides of the elastic sheet.

* * * * *